United States Patent
Kitano et al.

(10) Patent No.: US 9,719,599 B2
(45) Date of Patent: Aug. 1, 2017

(54) FLUID CONTROL DEVICE

(71) Applicant: FUJIKIN INCORPORATED, Osaka-shi (JP)

(72) Inventors: Taichi Kitano, Osaka (JP); Tsutomu Shinohara, Osaka (JP); Tadayuki Yakushijin, Osaka (JP); Tomohiro Nakata, Osaka (JP); Tsuyoshi Tanikawa, Osaka (JP); Michio Yamaji, Osaka (JP)

(73) Assignee: FUJIKIN INCORPORATED, Osaka-shi (JP)

(*) Notice: Subject to any disclaimer, the term of this patent is extended or adjusted under 35 U.S.C. 154(b) by 0 days.

(21) Appl. No.: 14/898,888

(22) PCT Filed: Nov. 12, 2014

(86) PCT No.: PCT/JP2014/079956
§ 371 (c)(1),
(2) Date: Dec. 16, 2015

(87) PCT Pub. No.: WO2015/098333
PCT Pub. Date: Jul. 2, 2015

(65) Prior Publication Data
US 2016/0369903 A1    Dec. 22, 2016

(30) Foreign Application Priority Data

Dec. 27, 2013   (JP) .................. 2013-271003

(51) Int. Cl.
*F16K 7/14*        (2006.01)
*F16K 27/00*       (2006.01)
*F15B 13/08*       (2006.01)

(52) U.S. Cl.
CPC .............. *F16K 7/14* (2013.01); *F16K 27/003* (2013.01); *F15B 13/0817* (2013.01)

(58) Field of Classification Search
CPC .. F16K 27/003; F16K 7/14; Y10T 137/87885; Y10T 137/5109;
(Continued)

(56) References Cited

U.S. PATENT DOCUMENTS 6,012,479 A    1/2000 Fukushima et al.
6,293,310 B1   9/2001 Redemann et al.
(Continued)

FOREIGN PATENT DOCUMENTS

JP    10-300000 A    11/1998
JP    2001-521120 A  11/2001
(Continued)

OTHER PUBLICATIONS

International Search Report mailed Feb. 17, 2015, issued for PCT/JP2014/079956.

*Primary Examiner* — Michael R Reid
(74) *Attorney, Agent, or Firm* — Locke Lord LLP

(57) ABSTRACT

As passages forming a main gas passage, each of the passage blocks 3 has a first inverted-V passage, a first outlet passage communicating between the apex of the first inverted-V passage and an outlet of a first on-off valve. As passages forming a vent gas passage, each of the passage blocks 3 has a second inverted-V passage and a second outlet passage communicating between the apex of the second inverted-V passage and an outlet of a second on-off valve. As passages forming a first sub-gas inflow passage, each of the passage blocks has a first inlet passage leading to an inlet of the first on-off valve and a common inlet passage. As passages forming a second sub-gas inflow passage, each of the passage blocks has a second inlet passage leading to an inlet of the second on-off valve and a communication path continued to the common inlet passage.

2 Claims, 6 Drawing Sheets

(58) Field of Classification Search
CPC ....... Y10T 137/5283; Y10T 137/87877; F15B 13/0817; F15B 13/0807; F15B 13/0803
USPC .............................. 137/269, 271, 883, 884
See application file for complete search history.

(56) References Cited

U.S. PATENT DOCUMENTS

| | | | |
|---|---|---|---|
| 8,707,997 B2* | 4/2014 | Igarashi | ............... F16K 11/20 137/883 |
| 2006/0060253 A1 | 3/2006 | Yoshida et al. | |
| 2006/0096533 A1 | 5/2006 | Mochizuki et al. | |
| 2009/0183792 A1* | 7/2009 | Tokuda | ............... F16K 27/003 137/798 |
| 2013/0333768 A1 | 12/2013 | Chandrasekharan et al. | |
| 2014/0326915 A1 | 11/2014 | Kitano et al. | |
| 2015/0075660 A1 | 3/2015 | Inada et al. | |

FOREIGN PATENT DOCUMENTS

| | | |
|---|---|---|
| JP | 2004-183743 A | 7/2004 |
| JP | 2013-231460 A | 11/2013 |
| WO | 2004/036099 A1 | 4/2004 |
| WO | 2013/084744 A1 | 6/2013 |

* cited by examiner (a)

(b)

FLUID CONTROL DEVICE

TECHNICAL FIELD

The present invention relates to a fluid control device used to supply a plurality of types of material gases by switching between them as appropriate to a processing chamber, for example, in a semiconductor processing apparatus.

BACKGROUND ART

As a fluid control device used to supply a plurality of types of material gases by switching between them as appropriate to a processing chamber, there is a known fluid control device that includes a main body having a rectangular parallelepiped shape, main gas input-output ports and vent gas input-output ports provided at both ends in the longitudinal direction of the main body, the main gas input-output ports being disposed at a certain distance from the vent gas input-output ports in the width direction, a main gas passage communicating between the main gas input-output ports, a vent gas passage communicating between the vent gas input-output ports, a plurality of sub-gas inlets provided at predetermined intervals in the longitudinal direction on one side of the body, a total of two rows of on-off valves arranged in the width direction (two on-off valves are disposed in each of positions corresponding to the sub-gas inlets), a plurality of first sub-gas inflow passages leading to the inlets of the on-off valves in the first row from the sub-gas inlets, and a plurality of second sub-gas inflow passages leading to the inlets of the on-off valves in the second row from the sub-gas inlets (for example, PTL 1).

In the fluid control device in PTL 1, the main body includes a plurality of central passage blocks and two side passage blocks extending in the front-rear direction, in which the main gas passage and vent gas passage are formed linearly and connected to the outlets of the on-off valves via the passage orthogonal to the main gas passage and vent gas passage.

CITATION LIST

Patent Literature

PTL 1: JP-A-2004-183743

SUMMARY OF INVENTION

Technical Problem

In the conventional fluid control device described above, different types of passage blocks are necessary, the side passage blocks have a shape that depends on the number of on-off valves, and the shape of the side passage block needs to be changed to increase or reduce the number of on-off valves. This complicates the structure of the main body and makes it difficult to increase or reduce the number of on-off valves.

In addition, in such a fluid control device, the passages that become dead volumes when vent gas flows need to be reduced.

An object of the invention is to provide a fluid control device including a main body of a simple structure, capable of increasing or reducing the number of on-off valves easily, and capable of further reducing dead volumes.

Solution to Problem

A fluid control device according to the present invention includes a main body having a rectangular parallelepiped shape, main gas input-output ports and vent gas input-output ports provided at both ends in a longitudinal direction of the main body, the main gas input-output ports being disposed at a certain distance in a width direction from the vent gas input-output ports, a main gas passage communicating between the main gas input-output ports, a vent gas passage communicating between the vent gas input-output ports, a plurality of sub-gas inlets provided on one side of the body, a plurality of on-off valves disposed in positions corresponding to the sub-gas inlets, the on-off valves being arranged in the width direction, and a plurality of sub-gas inflow passages leading to inlets of the on-off valves from the sub-gas inlets, wherein material gases introduced from the sub-gas inlets are switched as appropriate and supplied from an outlet of the main gas passage to a rear flow side processing chamber and a gas in the main body is exhausted via the vent gas passage, in which the main body is formed by disposing, in the longitudinal direction, passage blocks having concave portions accommodating the on-off valves, each of the passage blocks has, as passages forming the main gas passage, a first inverted-V passages opened at both ends in the longitudinal direction and a first outlet passage communicating between an apex of the first inverted-V passage and an outlet of each of the on-off valves, each of the passage blocks has, as passages forming the vent gas passage, a second inverted-V passage opened at both ends in the longitudinal direction and a second outlet passage communicating between an apex of the second inverted-V passage and the outlet of each of the on-off valves, and each of the passage blocks has, as the sub-gas inflow passages, an inlet passage leading to the inlet of the on-off valve, a common inlet passage continued to the inlet passage and communicating with the sub-gas inlet, and a communication path continued to the inlet passage and continued to the common inlet passage.

Since the main body is formed by disposing the passage blocks (passage blocks having the same shape), the number of on-off valves can be changed only by increasing or reducing passage blocks. The passage blocks adjacent to each other have passages (the first inverted-V passage and the second inverted-V passage) communicating between the adjacent passage blocks and these passages are continued to form the main gas passage and the vent gas passage. A sealing section including a gasket or the like is present between the adjacent passage blocks. The structure of the sealing section is not specifically limited.

Conventionally, the main gas passage and the vent gas passage are formed linearly and connected to the outlets of on-off valves via a passage orthogonal to the main gas passage and the vent gas passage. On the other hand, in the fluid control device according to the invention, the main gas passage and the vent gas passage are formed in a zigzag shape in which inverted-V passages are continued. Accordingly, the outlet passages communicating between the apexes of inverted-V passages and the outlets of on-off valves are relatively short.

The passages that become dead volumes when vent gas flows are the outlet passages communicating between the apexes of the inverted-V passages and the outlets of the on-off valves. Since the passages are shortened, dead volumes can be reduced.

The on-off valves are, for example, diaphragm valves. Preferably, each of the on-off valves includes a seat disposed detachably on a periphery of the outlet passage formed in each of the passage blocks, a seat holder disposed detachably in the concave portion of each of the passage blocks, the seat holder holding the seat, and a diaphragm opening and closing a fluid passage by being pushed against or separated from the seat, a fluid having flowed into the inlet passage communicating with the outlet passage via a through hole provided in the seat holder.

In such a structure, dead volumes can be reduced also in on-off valves and the on-off valves are supported by the above passage blocks in which the passages becoming dead volumes have been reduced, so a more preferable structure for reducing dead volumes is achieved.

The seat holder is well known and includes, for example, the inner periphery section that is perforated-disc-shaped and holds the seat, an intermediate annular section in which a plurality of through holes leading to fluid outflow passages are formed at predetermined intervals, and an outer periphery section clamping the outer periphery section of the diaphragm.

Preferably, the diaphragm valve further includes a retainer holding the seat holder. The retainer has, for example, an inward flange section that is substantially cylindrical and receives the outer periphery section of the seat holder.

The seat is preferably replaced after long period of use. Since the retainer holds the seat holder, by removing the retainer, the seat holder held by the retainer and the seat held by the seat holder can be removed, thereby facilitating the replacement of the seat.

The seat is made of, for example, synthetic resin, but may be of course made of metal. The seat holder and the retainer are preferably made of metal.

The diaphragm is formed by, for example, a nickel alloy thin plate, but may be formed by a stainless steel thin plate or a laminated body including stainless steel thin plates and nickel-cobalt alloy thin plates and the material of the diaphragm is not limited specifically. In addition, the diaphragm may be one plate or a laminated body in which a plurality of plates are laminated with each other and this selection can be made freely depending on specifications or conditions.

Advantageous Effects of Invention

In the fluid control device according to the invention, the main body is formed by disposing passage blocks with the same shape in the longitudinal direction and all necessary passages are formed in the passage block, so the number of on-off valves can be changed only by increasing or reducing the number of passage blocks, the main body has a simple structure, and the number of on-off valves can be easily increased or reduced. In addition, since the passages that become dead volumes can be very short outlet passages communicating between the apex of an inverted-V passage and the outlet of an on-off valve, dead volumes can be reduced.

Figure 1:
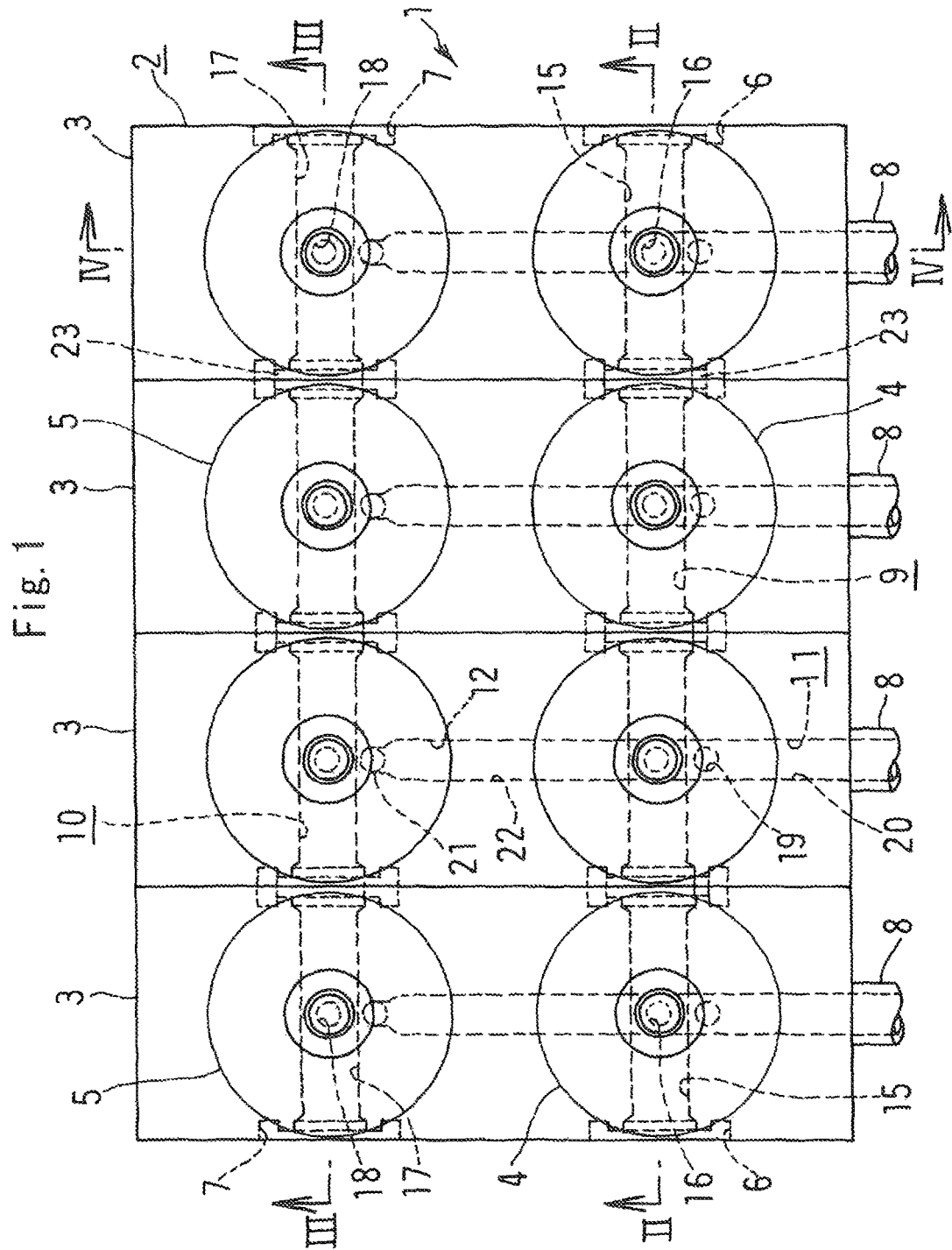
FIG. 1 is a plan view illustrating a fluid control device according to an embodiment of the present invention.

REFERENCE SIGNS LIST (1): fluid control device
(2): main body
(3): passage block
(4): first on-off valve (on-off valve in the first row)
(4a): inlet
(4b): outlet
(5): second on-off valve (on-off valve in the second row)
(5a): inlet
(5b): outlet
(6): main gas input-output port
(7): vent gas input-output port
(8): sub-gas inlet
(9): main gas passage
(10): vent gas passage
(11): first sub-gas inflow passage
(12): second sub-gas inflow passage
(13): first on-off valve receiving concave portion
(14): second on-off valve receiving concave portion
(15): first inverted-V passage
(16): first outlet passage
(17): second inverted-V passage
(18): second outlet passage
(19): first inlet passage
(20): common inlet passage
(21): second inlet passage
(22): communication path

DESCRIPTION OF EMBODIMENTS

An embodiment of the present invention will be described below with reference to the drawings. In the following description, the up and down indicate the up and down in FIG. 2. In addition, the left-right direction in FIG. 1 indicates the length direction and the up-down direction in FIG. 1 indicates the width direction.

Figure 2:
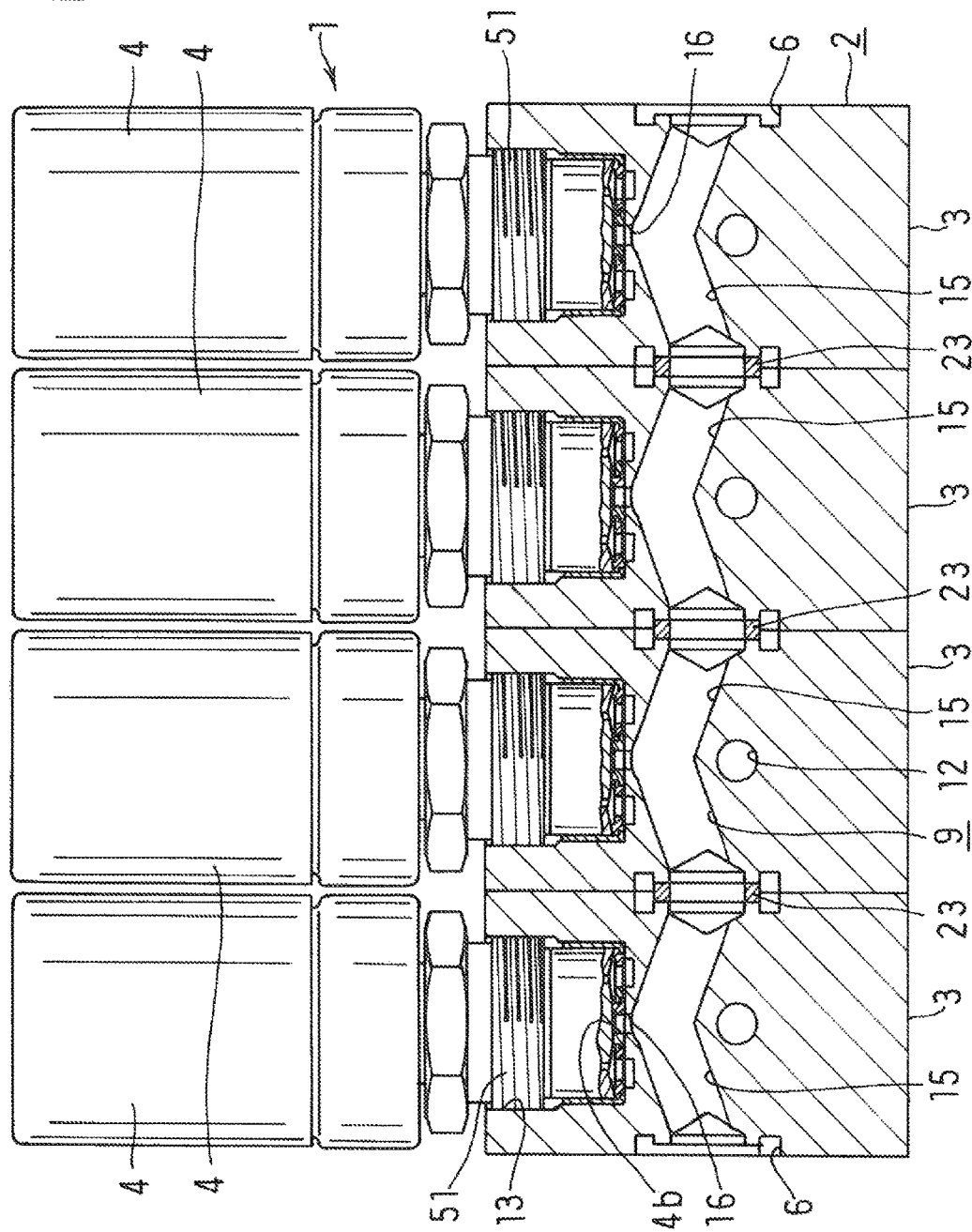
FIG. 2 is a cross sectional view along line II-II in FIG. 1.
Figure 3:
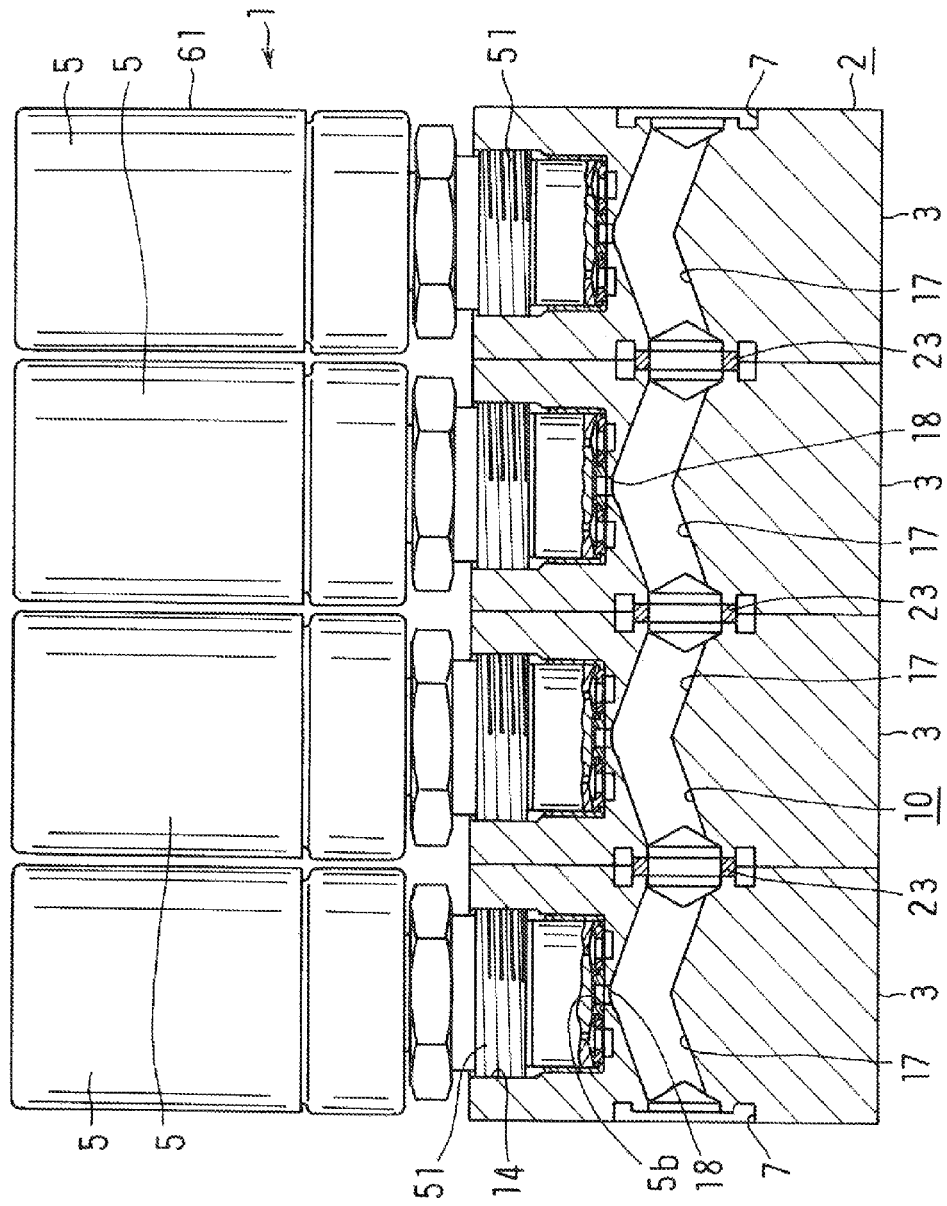
FIG. 3 is a cross sectional view along line III-III in FIG. 1.
Figure 4:
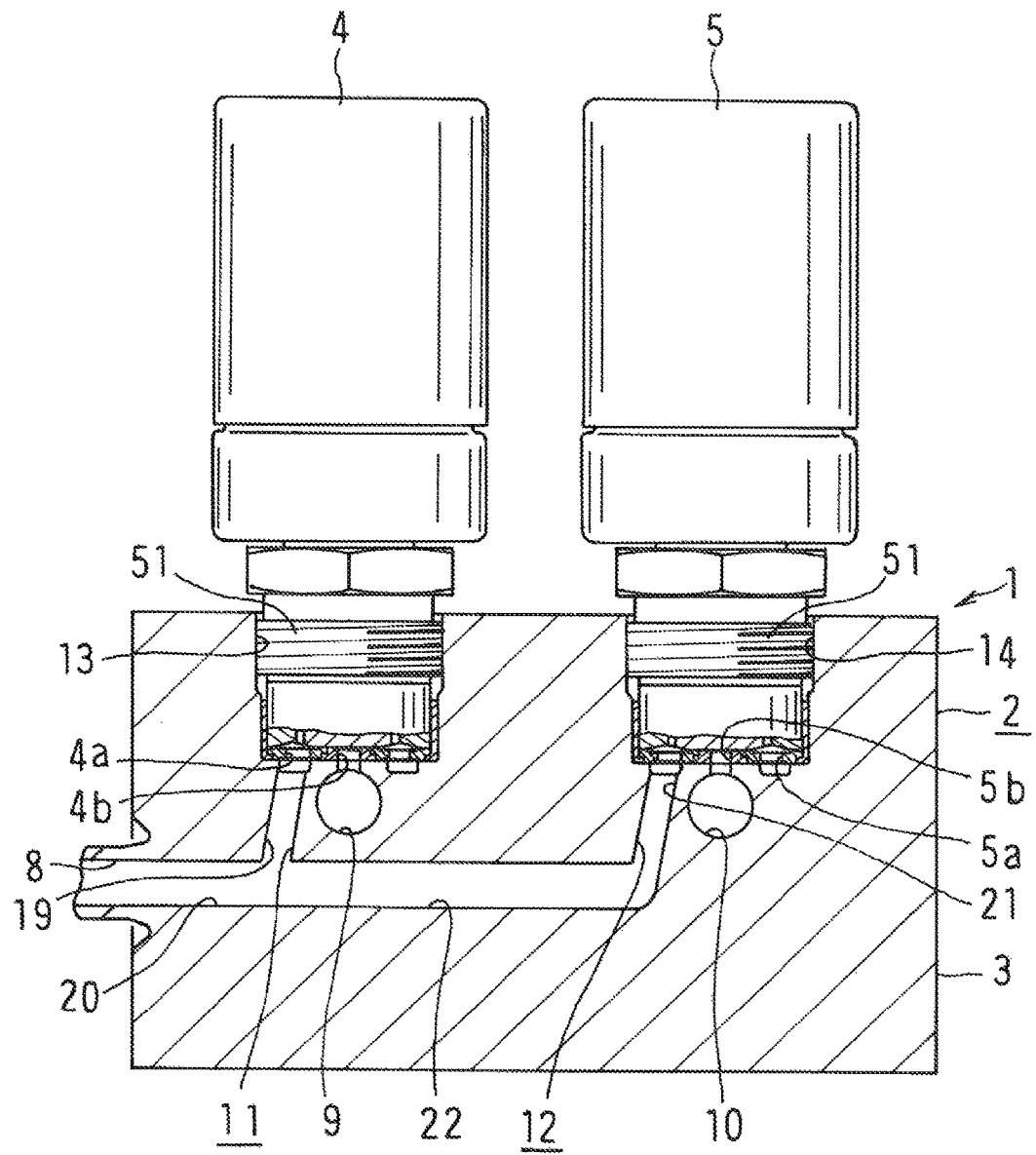
FIG. 4 is a cross sectional view along line IV-IV in FIG. 1.

FIG. 1 is illustrates a fluid control device according to an embodiment of the present invention. A fluid control device (1) is used to introduce a several types of gases by individually switching between them in, for example, an MOCVD (Metal Organic Chemical Vapor Deposition) process. The fluid control device (1) includes a rectangular parallelepiped main body (2) including a plurality of (four in the drawing) rectangular parallelepiped passage blocks (3) and first on-off valves (on-off valves in the first row) (4) and second on-off valves (on-off valves in the second row) (5). Each of the passage blocks (3) includes the two first on-off valves (4) and the two second on-off valves.

The main body (2) is provided with main gas input-output ports (6) and vent gas input-output ports (7) provided at both ends in the longitudinal direction of the main body (2), the main gas input-output ports (6) being disposed at a certain distance in the width direction from the vent gas input-output ports (7), sub-gas inlets (8) provided so as to be opened in the width direction of the passage blocks (3), a main gas passage (9) communicating between the main gas input-output ports (6), a vent gas passage (10) communicating between the vent gas input-output ports (7), a plurality of first sub-gas inflow passages (11) leading to inlets (4a) of the first on-off valves (4) from the sub-gas inlets (8), and a plurality of second sub-gas inflow passages (12) leading to inlets (5a) of the second on-off valves (5) from the sub-gas inlets (8).

The fluid control device (1) can switch between a plurality of types of material gases introduced from the sub-gas inlets (8) as appropriate to supply the gases from the outlet of the main gas passage (9) to the rear flow side processing chamber and can exhaust the gas in the main body (2) via the vent gas passage (10).

The main body (2) is not an integrated piece and formed by disposing a plurality of (four) passage blocks (3), each of which supports one first on-off valve (4) and one second on-off valve (5) and has the same shape, in the longitudinal direction.

The on-off valves (4) and (5) are two-port diaphragm valves having the same shape and are provided with the inlets (4a) and (5a) and outlets (4b) and (5b) at their lower ends. As described later, the outlet (4b) and (5b) are present at the centers of the on-off valves (4) and (5) in plan view and the inlets (4a) and (5a) are provided in the circumferences surrounding the outlets (4b) and (5b).

The lower parts (the parts including at least the lower ends at which the inlets (4a) and (5a) and the outlets (4b) and (5b) are provided) of the on-off valves (4) and (5) are accommodated in the first on-off valve receiving concave portion (13) and the second on-off valve receiving concave portion (14) provided in the passage block (3), respectively. The concave portions (13) and (14) are provided with female threads and the male threads formed in the outer surfaces of bonnets (51) of the on-off valves (4) and (5) are screwed with the female threads.

Each of the passage blocks (3) has, as passages forming the main gas passage (9), the first inverted-V passage (15), opened at both ends in the longitudinal direction, that is inverted-V-shaped seen in the width direction and the first outlet passage (16) communicating between the apex positioned at the middle in the longitudinal direction of the first inverted-V passage (15) and the outlet (4b) of the first on-off valve (4). The first outlet passage (16) is a short passage extending in the up-down direction (the direction orthogonal to the longitudinal direction and the width direction).

Each of the passage blocks (3) has, as passages forming the vent gas passage (10), the second inverted-V passage (17), opened at both ends in the longitudinal direction, that is inverted-V-shaped seen in the width direction and the second outlet passage (18) communicating between the apex positioned at the middle in the longitudinal direction of the second inverted-V passage (17) and the outlet (5b) of the second on-off valve (5). The second outlet passage (18) is a short passage extending in the up-down direction (the direction orthogonal to the longitudinal direction and the width direction).

Each of the passage block (3) has, as passages forming the first sub-gas inflow passage (11), the first inlet passage (19) leading to the inlet (4a) of the first on-off valve (4) and a common inlet passage (20) continued to the first inlet passage (19) at an obtuse angle, extending in the width direction, and leading to the sub-gas inlet (8).

Each of the passage block (3) has, as passages forming the second sub-gas inflow passage (12), the second inlet passage (21) leading to the inlet (5a) of the second on-off valve (5) and a communication path (22) continued to the second inlet passage (21) at an obtuse angle, extending in the width direction, and continued linearly to the common inlet passage (20).

The adjacent passage blocks (3) abut against each other so that the openings of the first inverted-V passages (15) are aligned with each other and the openings of the second inverted-V passages (17) are aligned with each other. The contact surfaces of the adjacent passage blocks (3) are provided with a sealing section (23). The sealing section (23) is well known and is not described in detail.

The more detailed structure (the structure of the first on-off valve (4) is the same as that of the second on-off valve (5)) of the on-off valves (4) and (5) will be described with reference to FIGS. 5 and 6.

Figure 5:
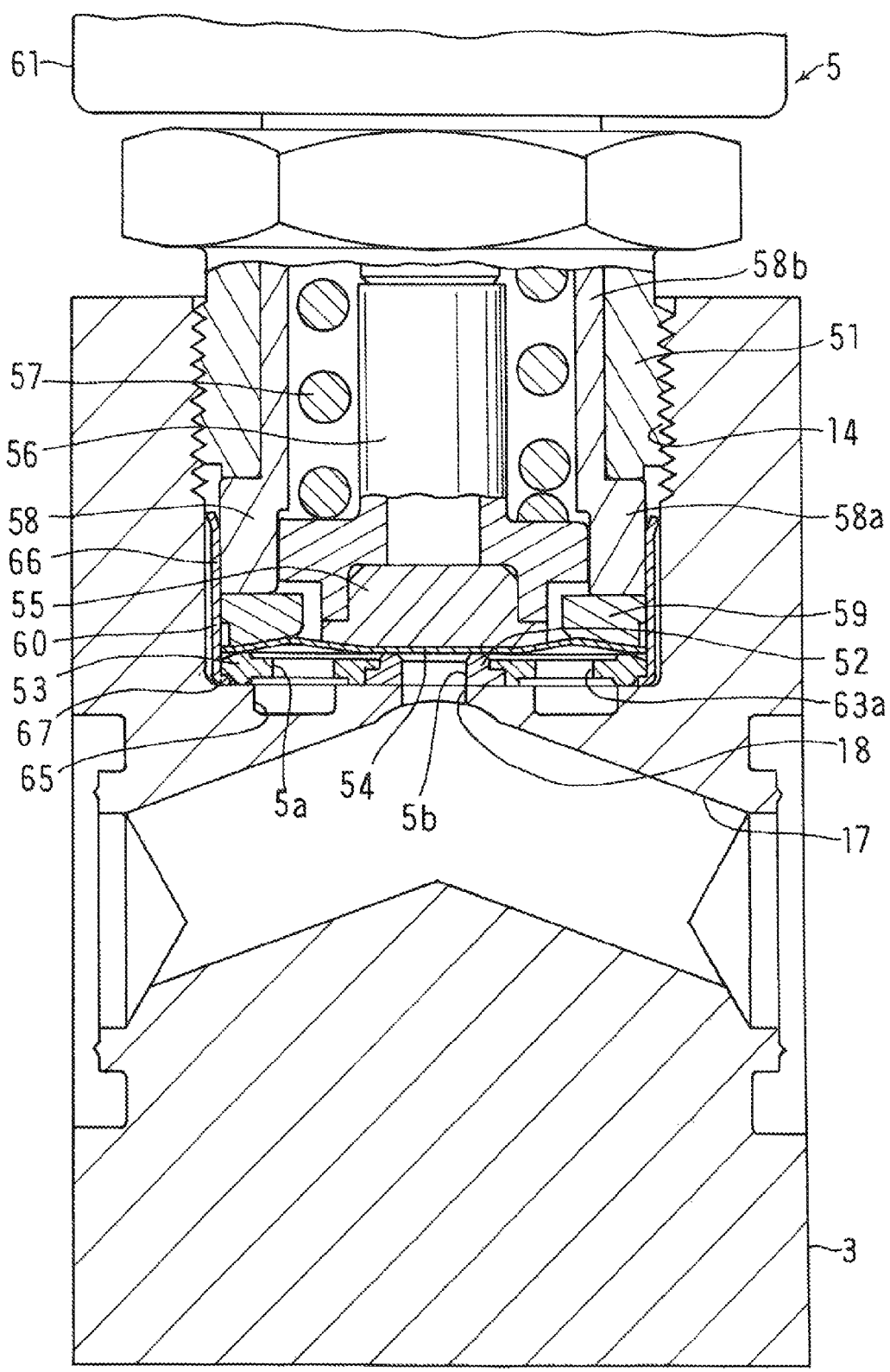
FIG. 5 is a vertical cross sectional view illustrating an example of an on-off valve used by the fluid control device according to the invention.

In FIG. 5, the on-off valve (5) includes the cylindrical bonnet (51) having a lower part screwed with an upper part of the on-off valve receiving concave portion (14) provided in the passage block (3) and extending upward, an annular seat (valve seat) (52) provided on the periphery of the opening of the outlet passage (18), a seat holder (53), provided on the outer periphery of the seat (52) in the concave portion (14), that holds the seat (52), a diaphragm (54) pushed against by or separated from the seat (52) and opening and closing the outlet passage (18), a stem (56), having a diaphragm holder (55) holding the center part of the diaphragm (54), in the lower part, that is inserted into the bonnet (51) movably upward and downward so that the diaphragm (54) is pushed against or separated from the seat (52) via the diaphragm holder (55), a compression coil spring (biasing member) (57) biasing the stem (56) downward, a guide cylinder (58) that is disposed on the inner periphery surface of the bonnet (51), guides the upward and downward movement of the stem (56), and restricts the movement range of the stem (56), a diaphragm holding ring (59), disposed between the upper surface of the outer periphery section of the diaphragm (54) and the lower end of the guide cylinder (58), that sandwiches the outer periphery section of the diaphragm (54) between the diaphragm holding ring (59) and the outer periphery section of the seat holder (53), a retainer (60), holding the seat holder (53), that is attached detachably to the lower end of the guide cylinder (58) and the diaphragm holding ring (59), and up-down movement means (not illustrated), incorporated in a casing (61), that moves the stem (56) and the diaphragm holder (55) upward or downward.

The guide cylinder (58) includes a thick part (58a) and a thin part (58b) continued upward from the thick part (58a). The inner circumference of the thick part (58a) has a diameter larger than the inner circumference of the thin part (58b) and the inner circumference of the thick part (58a) guides the outer circumference of a flange section provided on the stem (56). The outer circumference of the thick part (58a) has a diameter larger than the outer circumference of the thin part (58b) and the upper surface (the step surface between the thick part (58a) and the thin part (58b)) of the thick part (58a) receives the lower end surface of the bonnet (51). Accordingly, when the bonnet (51) is screwed with the concave portion (14), the guide cylinder (58) pushes the diaphragm holding ring (59) downward. As described above, the guide cylinder (58) is a member that not only guides the stem (56), but also fixes the diaphragm holding ring (59).

Figure 6:
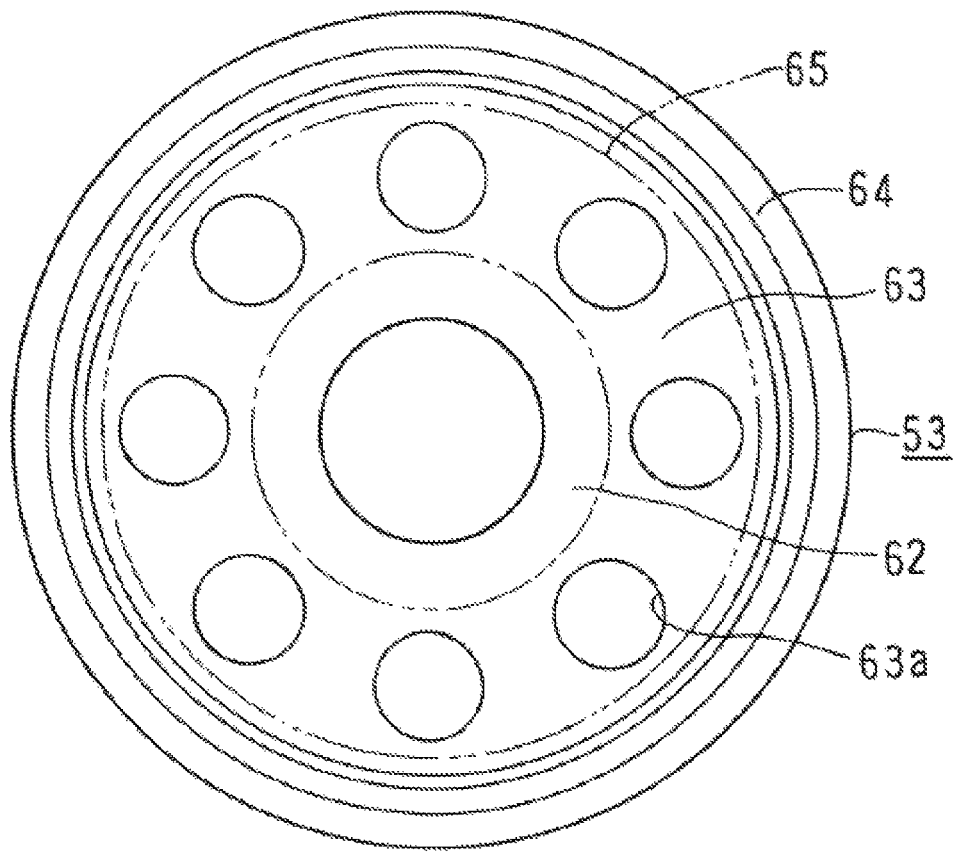
FIGS. 6(a) and (b) is an enlarged view of a seat holder included in the on-off valve; with FIG. 6 (a) being a plan view and FIG. 6 (b) being a vertical cross sectional view.
Figure 6:
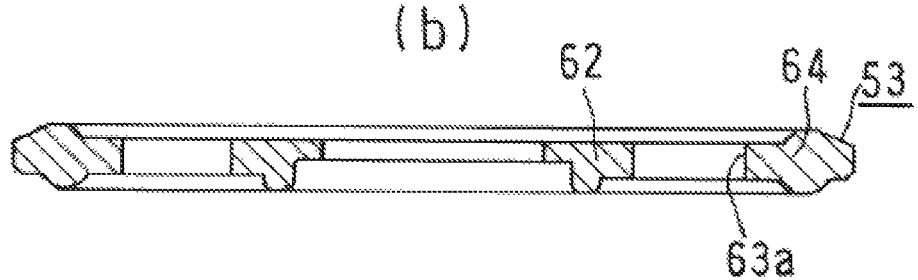

The seat holder (53) is a perforated disc made of metal and includes, as illustrated in detail in FIG. 6, an inner periphery section (62) holding the seat (52), an intermediate annular section (63) in which a plurality of through holes (63a) leading to the inlet passages are formed at predetermined intervals, and an outer periphery section (64) sandwiching the outer periphery section of the diaphragm (54) between the outer periphery section (64) and the diaphragm holding ring (59). The lower surface of the inner periphery section (62) is flush with the lower surface of the outer periphery section (64) and the upper surface of the inner periphery section (62) is flush with the upper surface of the outer periphery section (64). The seat (52) is fitted into the seat holder (53) from below. The lower surface of the inner periphery section (62) may not be flush with the lower surface of the outer periphery section (64) and the upper surface of the inner periphery section (62) may not be flush with the upper surface of the outer periphery section (64) and a step may be present.

On the bottom of the concave portion (14), an annular groove (65) is formed so as to border the through holes (63a) provided in the seat holder (53). In FIG. 6, this annular groove (65) is indicated by the dot-dot-dash line. The plurality of through holes (63a) provided in the seat holder (53) are the inlets (5a) of the on-off valves (5). In addition, the inner circumference of the annular seat (52) is the outlet (5b) of the on-off valve (5).

In the open state in which the diaphragm (54) is separated from the seat (52), the fluid having flowed into the inlet passages (19) and (21) of the passage block (3) flows into the annular groove (65), flows from the through holes (63a) of the seat holder (53), which are the inlets (5a) of the on-off valves (5), into the space formed in the lower surface of the diaphragm (54), passes through the inner circumference of the seat (52), which are the outlets (5b) of the on-off valves (5), and leads to the outlet passage (18) of the passage block (3).

The retainer (60) includes circumferential wall (66) that is substantially cylindrical, has an inner diameter substantially the same as the outer diameter of the seat (52), and is fitted into the lower end of the guide cylinder (58) and the outer circumference of diaphragm holding ring (59), and an inward flange section (67), provided at the lower end of the circumferential wall (66), that receives the outer periphery section of the seat holder (53). The circumferential wall (66) is provided with a plurality of slits (not illustrated) extending in the axial direction so as to facilitate the deformation of the circumferential wall (66).

The seat (52) is held by a diaphragm valve seat holder unit including the seat holder (53) and the retainer (60) and disposed in the concave portion (14) of the passage block (3). The seat (52) is generally replaced after a certain time period of use. When the seat (52) is replaced, the retainer (60) is removed so that the seat holder (53) and the seat (52) held by the seat holder (53) can be removed. Then, the seat (52) is replace and, the seat holder (53) is replaced as necessary, and the seat (52) is returned to the concave portion (14) in a state in which the seat (52) is held by the diaphragm valve seat holder unit including the seat holder (53) and the retainer (60). The seat (52) can be replaced easily in this way. Of course, the on-off valve (5) may not have the retainer (60). Since the retainer (60) is hardly elastically deformed, the retainer (60) can be generally used repeatedly. Accordingly, when using the retainer (60), the ease of replacement of the seat (52) is kept for a long time since the retainer (60) is not elastically deformed.

INDUSTRIAL APPLICABILITY

In the fluid control device used in an MOCVD process or the like, the structure of the main body is simple, on-off valves can be easily increased or reduced, and dead volumes can be further reduced, so the performance of a semiconductor processing apparatus having such a fluid control device can be improved.

The invention claimed is:

1. A fluid control device comprising:
a main body having a rectangular parallelepiped shape;
main gas input-output ports and vent gas input-output ports provided at both ends in a longitudinal direction of the main body, the main gas input-output ports being disposed at a certain distance in a width direction from the vent gas input-output ports;
a main gas passage communicating between the main gas input-output ports;
a vent gas passage communicating between the vent gas input-output ports;
a plurality of sub-gas inlets provided on one side of the body;
a plurality of on-off valves disposed in positions corresponding to the sub-gas inlets, the on-off valves being arranged in the width direction; and
a plurality of sub-gas inflow passages leading to inlets of the on-off valves from the sub-gas inlets,
wherein the main body is formed by disposing, in the longitudinal direction, passage blocks having portions accommodating the on-off valves,
each of the passage blocks has, as passages forming the main gas passage, first inverted-V passages opened at both ends in the longitudinal direction and a first outlet passage communicating between an apex of the first inverted-V passage and an outlet of each of the on-off valves,
each of the passage blocks has, as passages forming the vent gas passage, a second inverted-V passage opened at both ends in the longitudinal direction and a second outlet passage communicating between an apex of the second inverted-V passage and the outlet of each of the on-off valves, and
each of the passage blocks has, as the sub-gas inflow passages, an inlet passage leading to the inlet of the on-off valve, a common inlet passage continued to the inlet passage and communicating with the sub-gas inlet, and a communication path continued to the inlet passage and continued to the common inlet passage.

2. The fluid control device according to claim 1, wherein each of the on-off valves includes a seat disposed detachably on a periphery of the outlet passage formed in each of the passage blocks, a seat holder disposed detachably in the portion of each of the passage blocks, the seat holder holding the seat, and a diaphragm opening and closing a fluid passage by being pushed against or separated from the seat, a fluid having flowed into the inlet passage communicating with the outlet passage via a through hole provided in the seat holder.

* * * * *